United States Patent [19]

Murata

[11] Patent Number: 5,785,161
[45] Date of Patent: Jul. 28, 1998

[54] FLUID CLUTCH SYSTEM

[75] Inventor: Kiyohito Murata, Susono, Japan

[73] Assignee: Toyota Jidosha Kabushiki Kaisha, Toyota, Japan

[21] Appl. No.: 732,686

[22] Filed: Oct. 18, 1996

[30] Foreign Application Priority Data

Oct. 31, 1995 [JP] Japan .................................. 7-283632

[51] Int. Cl.[6] ............................................... F16H 45/02
[52] U.S. Cl. ................................... 192/3.29; 192/52.5
[58] Field of Search ........................ 192/3.29, 3.3, 192/52.5

[56] References Cited

U.S. PATENT DOCUMENTS

| | | | |
|---|---|---|---|
| 2,865,483 | 12/1958 | Livezey | 192/3.29 X |
| 3,239,042 | 3/1966 | Jandasek | 192/52.5 |
| 4,153,147 | 5/1979 | Chana | 192/3.28 |
| 4,640,395 | 2/1987 | Murasugi et al. | 192/3.31 |
| 5,456,343 | 10/1995 | Murata et al. | 192/3.29 |

FOREIGN PATENT DOCUMENTS

| | | |
|---|---|---|
| 0 182 312 | 5/1986 | European Pat. Off. . |
| 921 372 | 12/1954 | Germany . |
| 2 130 311 | 5/1984 | United Kingdom . |

*Primary Examiner*—Richard M. Lorence
*Attorney, Agent, or Firm*—Oblon, Spivak, McClelland, Maier & Neustadt, P.C.

[57] ABSTRACT

A fluid clutch system wherein a piston is hydraulically moved so as to come into frictional engagement with a surface opposing to the piston, comprising assistant pressure force generation device (26a and 40 in FIG. 2) for generating a pressure force which assists the frictional engagement force of the piston, whereby the transmission torque capacity of the fluid clutch system is enlarged without spoiling the on-vehicle mounting quality thereof.

8 Claims, 10 Drawing Sheets

ROTATIONAL DIRECTION OF ENGINE

FLUID CLUTCH SYSTEM

BACKGROUND OF THE INVENTION

1. Field of the Invention

The present invention relates to a fluid clutch system which is operated by hydraulic pressures.

2. Description of the Prior Art

In a clutch of such fluid type, a piston is arranged so as to be axially movable frontwards and rearwards relative to a surface opposing to the piston. Two oil chambers of a first oil chamber and a second oil chamber are formed on both the axial sides of the piston holding the piston therebetween. And the piston is advanced toward the opposing surface till its surface contact with the opposing surface by the difference between the internal pressures of both the first and second oil chambers, whereby a frictional engagement force is generated to transmit a torque between the piston and the opposing surface.

On this occasion, a friction surface attached a frictional material is formed on the piston or the opposing surface as the need arises.

Heretofore, the lockup clutch of a torque converter has been known as an example of such a fluid clutch.

FIG. 11 illustrates the torque converter having the prior-art lockup clutch.

Referring to the figure, the torque converter 1 is entirely enclosed with a front cover 2 and the pump cover 3a of a pump 3, and the interior thereof is filled up with oil (for example, an automatic transmission fluid abbreviated to "ATF"). Besides, a turbine 4, a stator 5 and the piston 7 of the lockup clutch 6 are disposed inside the torque converter 1.

In addition, a frictional material 8 is stuck on that part of the peripheral edge of the piston 7 which can come into contact with the surface S of the front cover 2 opposing to the piston 7. A first oil chamber 9 is formed on the side of the piston 7 near the front cover 2, and a second oil chamber 10 is formed on the side thereof near the turbine 4.

In case of engaging (or applying) the lockup clutch 6, the oil is supplied into the second oil chamber 10, while at the same time, it is discharged from the first oil chamber 9. As a result, the internal pressure of the second oil chamber 10 becomes higher than that of the first oil chamber 9. Therefore, the piston 7 is pushed onto the side of the front cover 2 and is advanced toward the front cover 2 until the frictional material 8 stuck on the piston 7 is pressed against the front cover 2.

In consequence, the first and second oil chambers 9, 10 are sealed or isolated from each other by the frictional material 8, and the frictional material 8 of the piston 7 is held in pressed contact with the front cover 2 by the difference between the pressures of both the oil chambers 9, 10. The lockup clutch 6 is engaged owing to a frictional engagement force generated by the pressed contact, and an engine torque is transmitted directly from the front cover 2 to the input shaft of a transmission (not shown) through the piston 7.

In recent years, however, the capacity of the transmission or delivery torque of a clutch has become insufficient due to various factors such as the lowering of the friction coefficient of oil intended to prevent a gear shift shock, the alteration of the structure of the clutch intended to cope with a slip control, and the increase of the output torque of an internal combustion engine. For the larger capacity of the transmission torque of the clutch, it is considered to enlarge the size of the clutch in the diametrical direction thereof. On the other hand, however, the performance of a torque converter has recently been remarkably enhanced, and the size of the torque converter body has been made smaller and smaller. In consequence, the difference AD between the sizes of the lockup clutch 6 and the torque converter body increases as shown in FIG. 11. Namely, the diameter of the lockup clutch 6 is larger in spite of the smaller diameter of the torque converter body. This leads to the problem that the on-vehicle mounting quality of the whole torque converter 1 worsens.

SUMMARY OF THE INVENTION

The present invention has been made in order to solve the problem of the prior art as stated above, and has for its object to provide a fluid clutch system in which the capacity of the transmission torque of a clutch can be increased without spoiling an on-vehicle mounting quality.

The present invention has achieved the above object by adopting a structure as defined in claim 1.

More specifically, according to the present invention, in generating a frictional engagement force in such a way that a piston is advanced toward a surface opposing to the piston till its contact with the opposing surface by the difference between the internal pressures of first and second oil chambers, a pressure force is generated by assistant pressure force generation means so as to assist the frictional engagement force. Therefore, the frictional engagement force to be generated between the piston and the surface opposing thereto is increased, and the capacity of the transmission torque of a clutch can be enlarged without enlarging the diameter of the piston.

A preferable aspect of performance consists in that the piston is joined through an engagement portion with a transmission member which is mated with the piston, and that the assistant pressure force generation means is so constructed as to hold a piston side member and the transmission member in contact at the engagement portion with an inclination of predetermined angle at which the piston undergoes a component force in the axial direction thereof. Thus, the transmission torque capacity can be enlarged by minor improvements in the constituent parts of the prior-art clutch.

Another preferable aspect of performance consists in comprising second frictional force generation means for generating a further frictional engagement force at a position separate from said opposing surface, by receiving a reaction force of the assistant pressure force when said assistant pressure force has been generated. Thus, the first-mentioned frictional engagement force is increased still more, so that the transmission torque capacity can be further enlarged.

Still another preferable aspect of performance consists in that the assistant pressure force generation means generates assistant pressure forces which differ between during forward rotation of an engine and during reverse rotation thereof. Thus, a pressure force for engaging (or applying) the clutch can be relieved in, e.g., an engine braking mode, so that a required gain can be made smaller, namely, the actual change of the frictional engagement force can be made smaller relative to the actual change of the differential pressure based on oil, to enhance the precision of a clutch control.

BRIEF DESCRIPTION OF THE DRAWINGS

The above and other objects, features and advantages of the present invention will become more apparent from the

Figure 1:
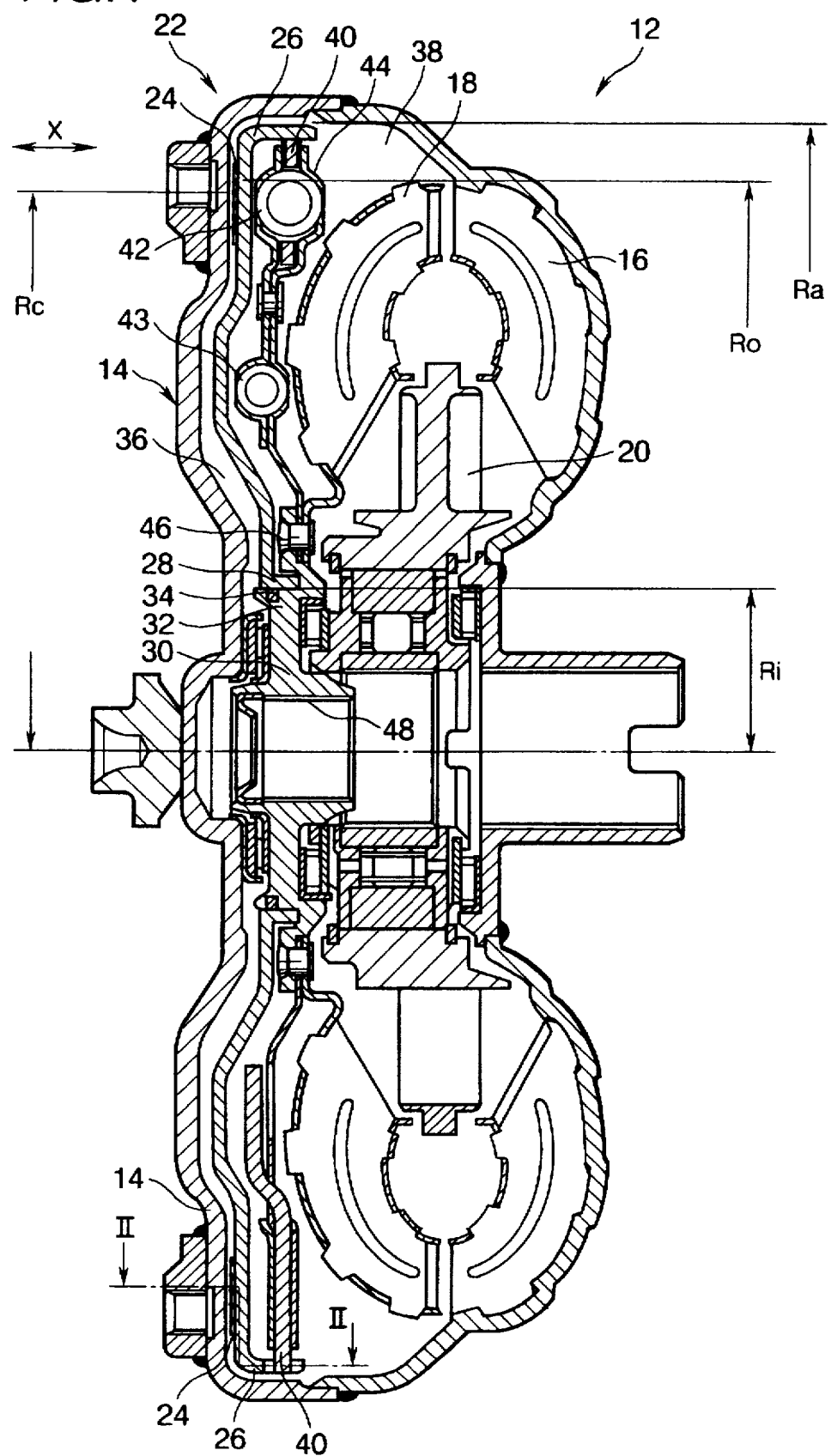
Figure 2:
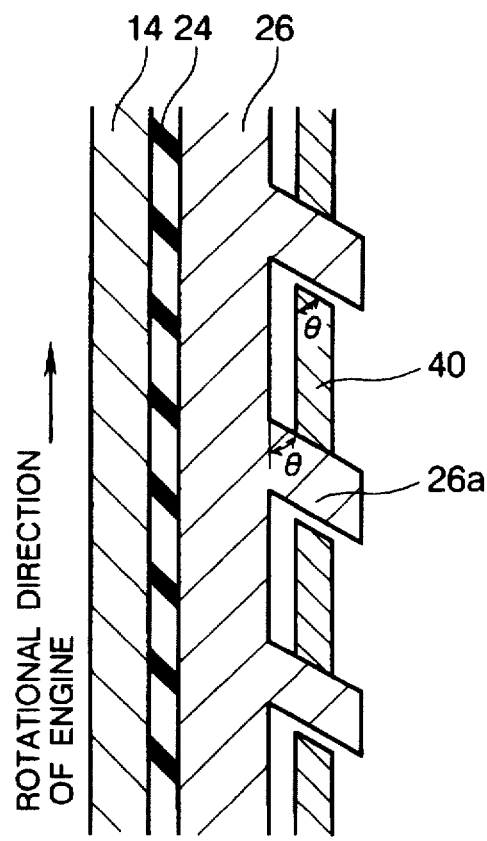
Figure 3:
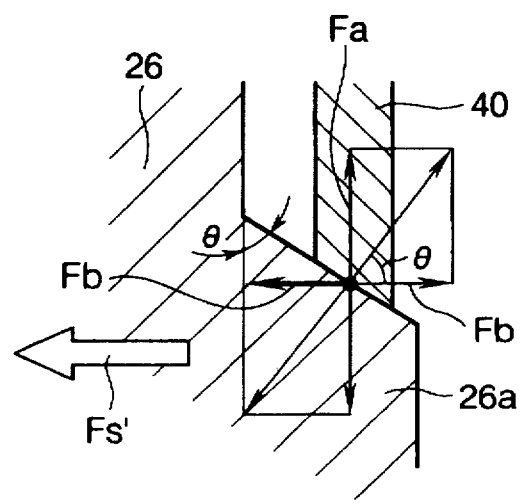
Figure 4:
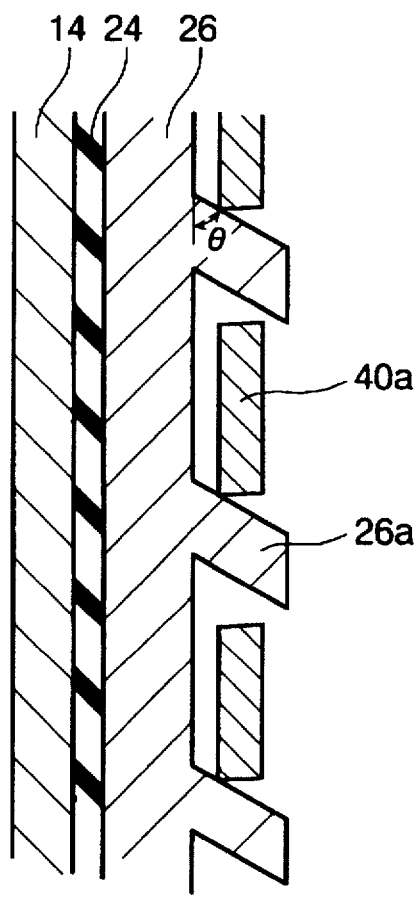
Figure 5:
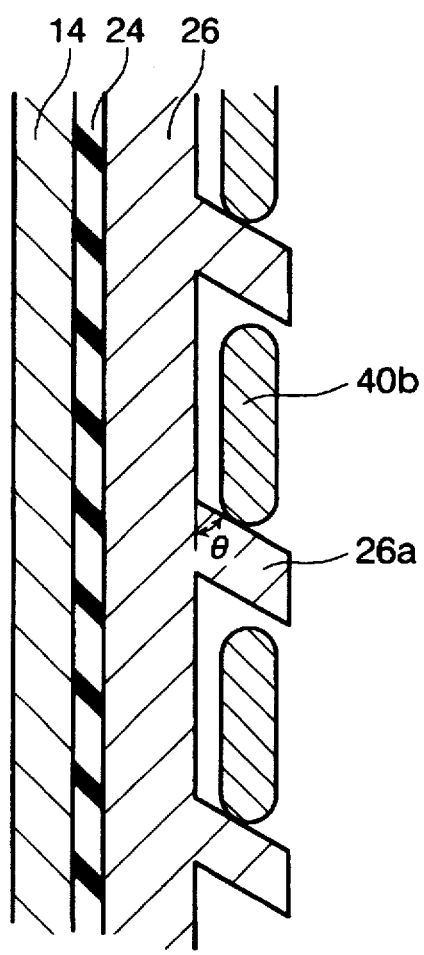
Figure 6:
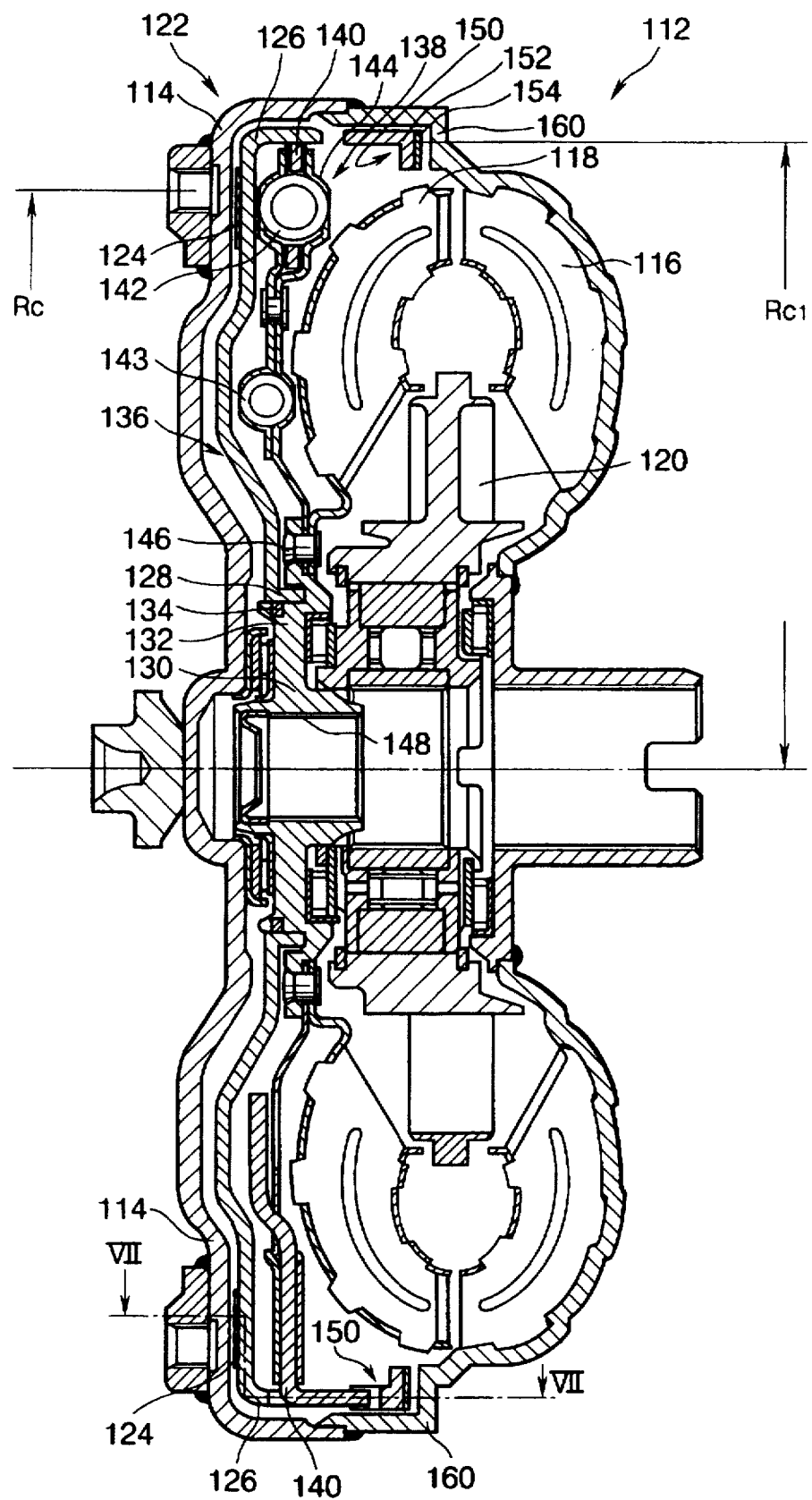
Figure 7:
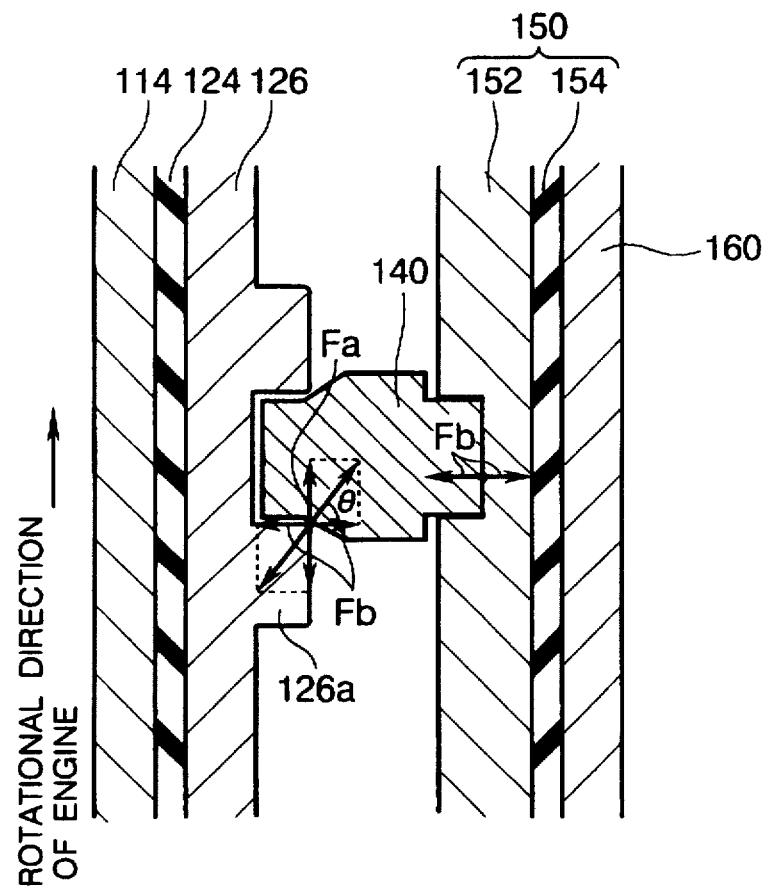
Figure 8:
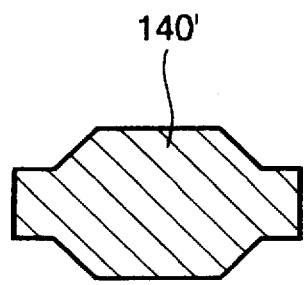
Figure 9:
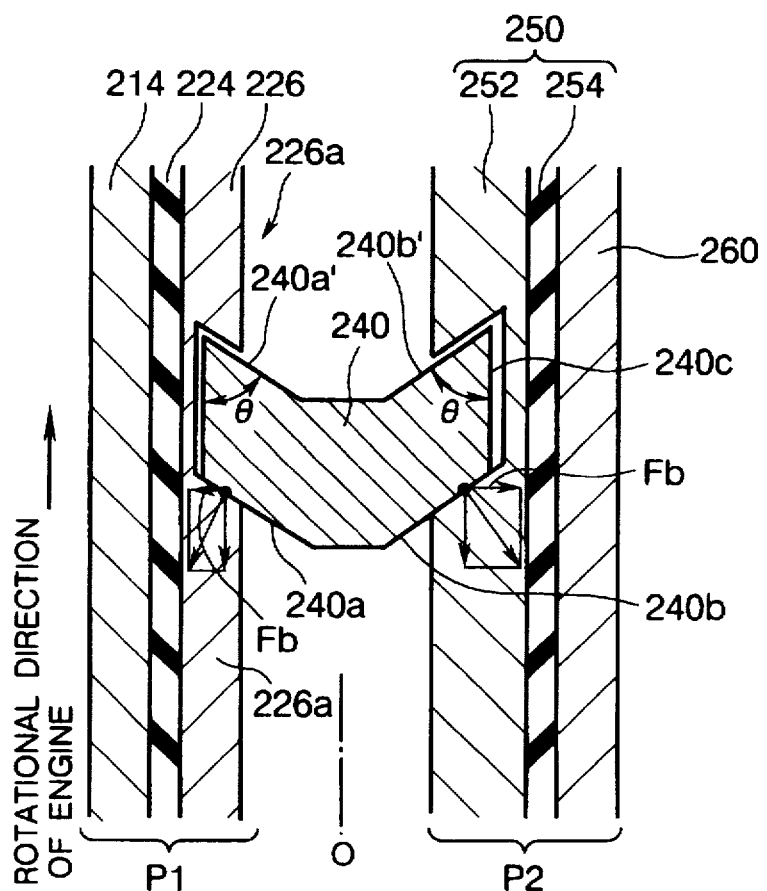
Figure 10:
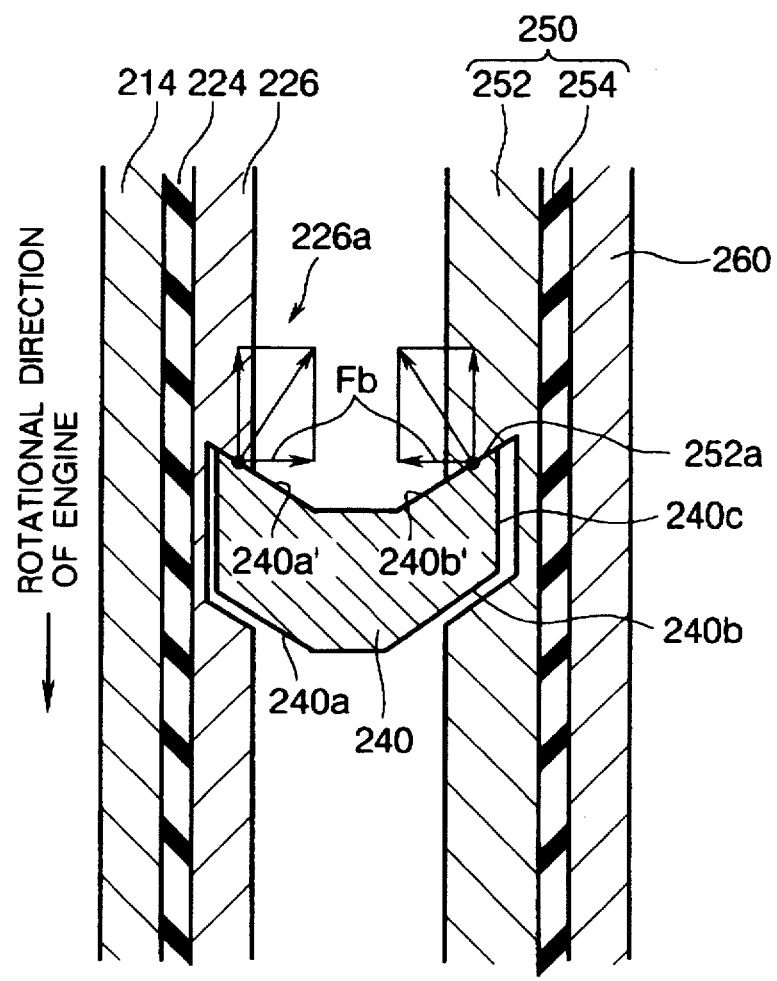
Figure 11:
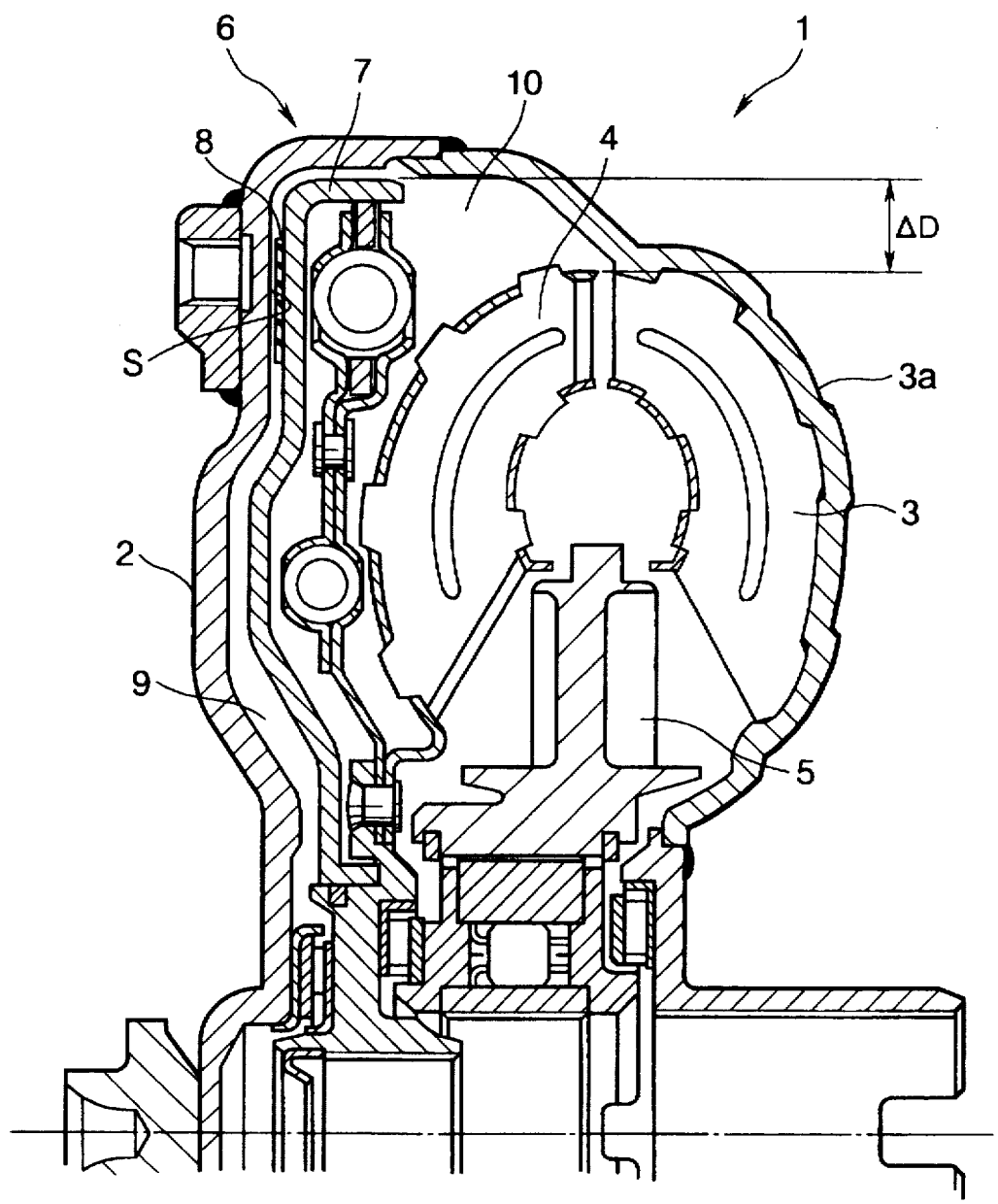
Figure 12:
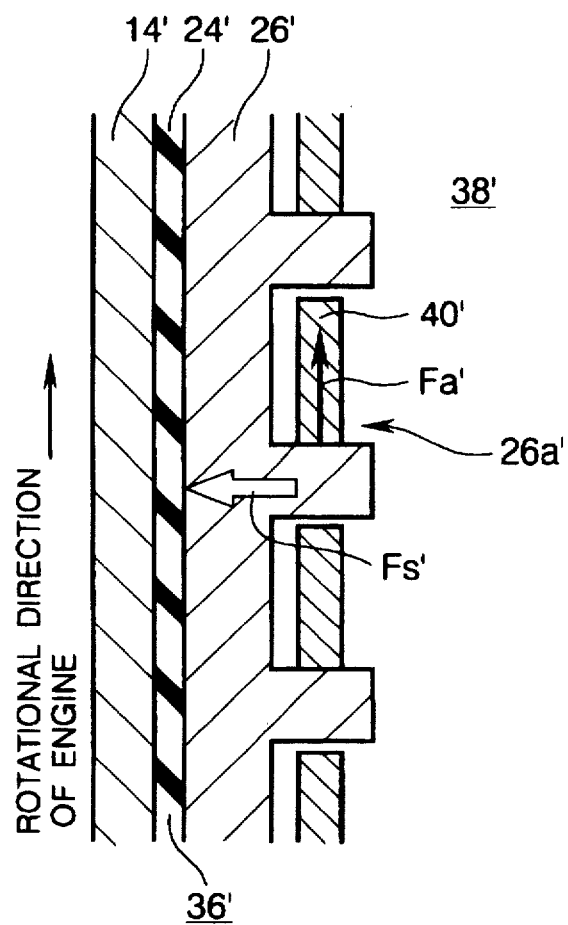

3 following description of the invention taken in conjunction with the accompanying drawings, wherein like reference characters designate the same or similar parts, and wherein:

FIG. 1 is a vertical sectional view showing a torque converter with a lockup clutch according to the first aspect of performance of the present invention;

FIG. 2 is an enlarged sectional view taken along line II—II indicated in FIG. 1;

FIG. 3 is an explanatory diagram showing the functions of forces at an engagement portion;

FIG. 4 is an explanatory diagram showing the shapes of the engagement portion and a spring location;

FIG. 5 is an explanatory diagram showing the shapes of an engagement portion and a spring location similarly to FIG. 4;

FIG. 6 is a vertical sectional view showing a torque converter with a lockup clutch according to the second aspect of performance of the present invention;

FIG. 7 is an enlarged sectional view taken along line VII—VII indicated in FIG. 6;

FIG. 8 is an explanatory diagram showing another shape of a spring location;

FIG. 9 is an enlarged sectional view correspondent to FIG. 7, showing a spring location according to the third aspect of performance of the present invention;

FIG. 10 is an enlarged sectional view correspondent to FIG. 7, showing the state of the reverse rotation mode of an engine;

FIG. 11 is a vertical sectional view showing a torque converter with a lockup clutch in the prior art; and FIG. 12 is a sectional view showing the shapes of an engagement portion and a spring location in the prior art.

DETAILED DESCRIPTION OF THE PREFERRED EMBODIMENTS

Examples of the more practicable aspects of performance of the present invention will now be described in detail with reference to the drawings.

The first aspect of performance of the present invention will be described. In this first aspect of performance, the torque transmission capacity of a clutch is increased with a known system construction substantially left intact and merely by making minor alterations in the system construction.

FIG. 1 illustrates the vertical sectional view of a torque converter with a lockup clutch (a fluid clutch system) according to the first aspect of performance. Referring to FIG. 1, the torque converter 12 is mainly constructed of a pump 16, a turbine 18 and a stator 20. The lockup clutch (fluid clutch system) 22 is mainly constructed of a piston 26 on which a frictional material 24 is stuck, and a front cover 14 which forms a surface opposing to the piston 26. A flange portion 28 formed at the lower part of the piston 26 is mounted on the bearing portion 32 of a turbine hub 30 so as to be slidable in the axial direction X of the piston 26 (the axial direction. X being the front or rear direction of the piston 26, or the direction of the drawing). The flange portion 28 is sealed up by a sealing member 34.

A first oil chamber 36 and a second oil chamber 38 are defined on both the sides of the piston 26 in the axial direction X. The piston 26 is moved frontwards or rearwards in the axial direction X by the difference between the internal pressures of both the oil chambers 36 and 38. When the pressure of the second oil chamber 38 is higher, the piston 26 is moved frontwards till the frictional material 24 contacts with the front cover 14, whereby a frictional engagement force is generated. Thus, the torque converter 12 falls into the torque transmission state in which the torque of an engine (not shown) is directly transmitted or delivered to the turbine hub 30 by the lockup clutch 22.

Concretely, on this occasion, the torque is transmitted to a holding cover 44 through a spring location (transmission member) 40 held in engagement with the piston 26, and then through first and second damper springs 42 and 43. The inner peripheral side of the holding cover 44 is fixed to the turbine hub 30 by rivets 46. Further, a spline 48 is provided on the inner peripheral side of the turbine hub 30, to engage with the input shaft of a gear shift mechanism not shown. Thus, the torque transmitted to the turbine hub 30 is delivered to the gear shift mechanism therefrom.

FIG. 2 illustrates a enlarged sectional view taken along line II—II indicated in FIG. 1. As seen from FIG. 2, the piston 26 is joined with the aforementioned spring location 40 at an engagement portion 26a so as to transmit the torque.

Here in the first aspect of performance, assistant pressure force generation means is formed by contriving the shapes of the engagement portion 26a and the spring location 40.

For the sake of comparison, the shapes of corresponding portions in the prior art are illustrated in FIG. 12. Incidentally, since the vertical sectional view of the whole torque converter in the prior art is similar to FIG. 1, the constituent parts of the prior-art torque converter shall be cited by affixing symbols ' to the reference numerals indicated in FIG. 1. In the prior art, the engagement portion 26a' is formed horizontal as shown in FIG. 12. Accordingly, the engagement portion 26a' pushes the spring location 40' in only the same direction as the rotating direction of the engine. Namely the engagement portions 26a' does not generate a force in any other direction. As a result, a pressure force Fs' which presses the piston 26' against the front cover 14' is generated only by the pressure difference between the second oil chamber 38' and the first oil chamber 36'.

Besides, assuming that the piston 26' acts effectively on an intervenient part from a radius Ri to a radius Ro as indicated in FIG. 1, the effective area Sp' of the piston 26' becomes $Sp'=\pi(Ro^2-Ri^2)$. On this occasion, letting Ps' denote the pressure difference, the pressure force Fs' of the piston 26' becomes a value Fs'=Sp'·Ps' based on only the oil pressure. Accordingly, the transmission torque capacity Tco' of the lockup clutch 22' in the prior art becomes Tco'=μ·Rc·Fs' where symbol μ denotes the friction coefficient of the frictional material 24', while symbol Rc denotes the effective radius of a friction surface.

In contrast, according to the first aspect of performance, as shown in FIG. 2, the engagement portion 26a is not horizontal, but it has a predetermined angle θ. Besides, the spring location 40 is in the shape conformed to the inclined engagement portion 26a. The engagement portion 26a and the spring location 40 thus formed with the inclination of the predetermined angle θ constitute the assistant pressure force generation means for generating a pressure force which assists the frictional engagement force of the piston 26, whereby the transmission torque capacity of the lockup clutch 22 is increased. This effect will be detailed below.

The situation of forces acting between the engagement portion 26a and the spring location 40 is illustrated in FIG. 3 on an enlarged scale. In a case where the hydraulic pressure of the second oil chamber 38 is higher than that of the first oil chamber 36, the piston 26 is pressed to the side of the front cover 14 by the resulting difference of the pressures until the frictional material 24 comes into contact with the front cover 14. When the pressure force (frictional engagement force) has acted on the piston 26 still more, the lockup clutch 22 is brought into complete engagement. Therefore, the piston 26 is connected with the front cover 14, to rotate in the same rotational direction of the engine. When the engine rotates in a direction indicated in FIG. 2, the engagement portion 26a pushes the spring location 40 with a force Fa in the same rotational direction of the engine (upwards as viewed in FIG. 3) as shown in FIG. 3. Letting the radius of the engagement portion 26a be Ra as indicated in FIG. 1, the magnitude of the force Fa can be expressed as Fa=Tco'/Ra using the transmission torque capacity Tco' stated above. Accordingly, a force Fb=Fa/tanθ acts rightwards as viewed in FIG. 3, and the spring location 40 comes to push the engagement portion 26a leftwards with a force of magnitude Fb which is generated as reaction against the above force Fb. The pressure force Fs of the piston 26 becomes a resultant force which consists of the pressure force Fs' based on only the oil pressure, and the reaction force Fb. That is, the pressure force Fs is expressed by the following equation:

$$\begin{aligned} Fs &= Fs' + Fb = Fs' + Fa/\tan\theta \\ &= Fs' + (Tco'/Ra)/\tan\theta \\ &= Fs' + (\mu \cdot Rc \cdot Fs')/(Ra \cdot \tan\theta) \\ &= \{1 + (\mu \cdot Rc)/(\tan\theta \cdot Ra)\} \cdot Fs' \end{aligned}$$

Thus, the transmission torque capacity Tc of the lockup clutch 22 in this aspect of performance is expressed by the following equation:

$$\begin{aligned} Tc &= \mu \cdot Rc \cdot Fs \\ &= \mu \cdot Rc \cdot \{1 + (\mu \cdot Rc)/(\tan\theta \cdot Ra)\} \cdot Fs' \end{aligned}$$

Thus, according to this aspect of performance, the transmission torque capacity is enlarged in correspondence with (μ·Rc)/(tanθ·Ra). That is, according to this aspect of performance, the transmission torque capacity can be enlarged by making the minor alterations of the parts with the known system construction substantially left intact.

Meanwhile, regarding the shape of the spring location 40, various ones are thought out. In the case of the shape as shown in FIG. 2, the surface of the spring location 40 lying in contact with the engagement portion 26a has the same inclination of the predetermined angle θ as the inclination of the contact surface of the engagement portion 26a, so that both surfaces can contact superior. Besides, as an example, a spring location 40a in the same shape as in the prior art as shown in FIG. 4 can be fabricated by the same easy press molding as in the prior art. As another example, in a case where the surface of a spring location 40b lying in contact with the engagement portion 26a is formed into a curved surface of circular arc shape as shown in FIG. 5, there is the merit that the angle θ can be reliably defined. The shape of the spring location 40 is not restricted to such examples, but it may well be any of other various shapes. Furthermore, any of the shapes may well be applied to the side of engagement portion 26a. It is possible to adopt various combinations of the shapes as long as the component force Fb pushing the piston 26 in the axial direction X can be generated.

Next, the second aspect of performance of the present invention will be described.

FIG. 6 illustrates the vertical sectional view of a torque converter with a lockup clutch according to the second aspect of performance.

In the second aspect of performance, the torque converter with the lockup clutch according to the first aspect of performance illustrated in FIG. 1 is provided with a reaction member 150 anew, and the reaction member 150 and a pump cover 160 comprises second frictional force generation means. The reaction member 150 is pressed against the pump cover 160 so as to generate a reaction force. The reaction member 150 is constructed by sticking a frictional material 154 on a plate 152. This reaction member 150 is rotated together with a piston 126, and is slidable in the axial direction X of the piston 126. In addition, the shapes of the piston 126 and a spring location 140 are somewhat altered due to the provision of the reaction member 150. However, since the remaining constituent members or parts are the same as in the first aspect of performance, they shall be designated in FIG. 6 by reference numerals the two lower digits of which are the same as in FIG. 1, respectively.

FIG. 7 illustrates an enlarged sectional view taken along line VII—VII indicated in FIG. 6, in order to clarify the shapes of the piston 126 and the spring location 140.

Likewise to the operation of the first aspect of performance, when the lockup clutch 122 has been engaged or applied by the difference between the internal pressures of first and second oil chambers 136 and 138, the piston 126 is rotated in the same rotational direction of an engine unitarily with a front cover 114. As shown in FIG. 7, the engagement portion 126a of the piston 126 pushes the spring location 140 with a force Fa in the same rotational direction of the engine (upwards as viewed in FIG. 7). In this aspect of performance, an inclination of predetermined angle θ is formed at the part of the spring location 140, the part at which the spring location 140 contacting with the engagement portion 126a. Accordingly an axial component force Fb is generated in the same way as in the first aspect of performance. The principle thus far explained is identical to that of the first aspect of performance. Especially in the second aspect of performance, the spring location 140 presses the reaction member 150 rightwards in FIG. 7 with the axial component force Fb. The pressed reaction member 150 is brought into contact with the pump cover 160 being unitary with the front cover 114, and is brought into engagement therewith at the frictional material 154, so that all these constituent members are unitarily rotated. More specifically, since the reaction member 150 is brought into engagement with the pump cover 160 (which is unitary with the front cover 114) through the frictional material 154 by the reaction force Fb, a force assisting the pressure force of the piston 126 can be obtained owing to the reaction force Fb, simultaneously with the aforementioned force Fb which develops between the spring location 140 and the engagement portion 126a. In this aspect of performance, accordingly, a total assistant force of 2·Fb acts on the piston 126 in addition to a force Fs based on the pressure difference.

Letting symbol Rc1 denote the effective radius of the friction surface of the frictional material 154 of the reaction member 150, the transmission torque capacity Tc1 of the lockup clutch 122 in this case is expressed by the following equation (where symbol Rc denotes the effective radius of the friction surface of a friction material 124, and symbol p denotes the friction coefficient of the frictional material 124, similarly to those in the first aspect of performance):

$$Tc1=\mu \cdot Rc \cdot Fs+\mu \cdot Rc \cdot Fb+\mu \cdot Rc1 \cdot Fb$$

Assuming here that Rc=Rc1 is held, the following equation (1) is obtained:

$$Tc1 = \mu \cdot Rc \cdot (Fs + 2 \cdot Fb) \quad (1)$$
$$= \mu \cdot Rc \cdot \{1 + 2 \cdot (\mu \cdot Rc)/(\tan\theta \cdot Ra)\} \cdot Fs$$

Thus, according to this aspect of performance, the transmission torque capacity is enlarged in correspondence with $2 \cdot (\mu \cdot Rc)/(\tan\theta \cdot Ra)$.

In the first aspect of performance, the axial component force Fs is received by only the spring location 40, whereas in the second aspect of performance, the force Fs is received by the pump cover 160 through the reaction member 150 as stated above. In consequence, the axial force acting on the spring location 140 can be balanced to bring forth the effects that the friction of the spring location 140 as a damper decreases and internal noise ascribable to the friction lowers. As another effect, the durability of the lockup clutch 122 is enhanced owing to the enlarged friction surfaces.

Incidentally, the shape of the spring location 140 is not restricted to the example shown in FIG. 7, but it may be any shape for generating a plus thrust force, e.g., a bilaterally symmetric shape as shown in FIG. 8.

Next, the third aspect of performance of the present invention will be described.

In the third aspect of performance, the shape of the spring location 140 in the second aspect of performance is altered, while the shapes of the piston 126 and reaction member 150 are also altered in conformity with the alteration of shape of the spring location 140, whereby different pressure forces are generated between during the forward rotation of an engine and during the reverse rotation thereof. Accordingly, a vertical sectional view showing the whole torque converter in the third aspect of performance is identical to FIG. 6. FIG. 9 illustrates a sectional view which corresponds to FIG. 7 showing the shapes of the spring location 140, etc.

As shown in FIG. 9, a spring location 240 in the third aspect of performance is bilaterally symmetric. The part of the spring location 240, adapted to come into contact with the engagement portion 226a of a piston 226 has an inclined plane 240a of predetermined angle θ. On the other hand, the part of the spring location 240, adapted to come into contact with the plate 252 of a reaction member 250 has an inclined plane 240b inverse to the inclined plane 240a. In addition, planes 240a' and 240b' opposite to the inclined planes 240a and 240b are parallel to these inclined planes 240a and 240b, respectively.

Referring to FIG. 9, in the driving state (the forward rotation mode) of the engine, the piston 226 is brought into contact with a front cover 214 by a force Fs generated on the basis of hydraulic pressures (a differential pressure), and is rotated unitarily with the front cover 214. Then, the engagement portion 226a of the piston 226 abuts against the inclined plane 240a of the spring location 240. As in the second aspect of performance, accordingly, a force Fa acts upwards in FIG. 9, and a force Fb acts rightwards, so that the spring location 240 is moved rightwards in the figure. The front cover 214 and a pump cover 260 are kept rotating unitarily, while the piston 226 and the plate 252 of the reaction member 250 are also kept rotating unitarily. Therefore, (although the force Fs based on the hydraulic pressures acts on only a side P1 indicated in FIG. 9,) the side P1 and a side P2 become quite symmetric with respect to a center O, as regards the generation of assistant forces Fb.

S Accordingly, the spring location 240 exerts the forces of the magnitude Fb on the piston 226 and the reaction member 250 so as to push them out leftwards and rightwards, respectively, as indicated by arrows in FIG. 9. As a result, on the side of a frictional material 224, a frictional engagement force is increased in correspondence with the force Fb more than the force Fs based on the hydraulic pressures. Besides, the force Fb as a frictional engagement force is generated on the side of a frictional material 254. Assuming Rc=Rc1 as in the second aspect of performance, therefore, the transmission torque capacity Tc2 of a lockup clutch in this case is expressed by the same equation (1) as in the second aspect of performance and is enlarged.

On the other hand, in the engine braking operation (the reverse rotation mode) of the engine, the engine falls into its driven state, and the relative rotations of the engine and the piston 226 are reversed as indicated by arrows in FIG. 10. In this case, owing to a process which is quite inverse to the above, the engagement portion 226a of the piston 226 abuts against the inclined plane 240a' of the spring location 240, while the engagement portion 252a of the plate 252 abuts against the inclined plane 240b' of the spring location 240. As a result, the front cover 214, piston 226 and spring location 240 are unitarily rotated. Accordingly, two forces Fb as shown in FIG. 10 are generated.

In this case, each of the forces Fb acts in a direction opposite to the direction thereof in the forward rotation mode of the engine. Therefore, the piston 226 and the reaction member 250 are both drawn inwards, and the frictional engagement forces of the frictional materials 224 and 254 are respectively weakened in correspondence with the forces Fb. Accordingly, the transmission torque capacity Tc3 of the lockup clutch in this case is expressed by the following equation:

$$Tc3 = \mu \cdot Rc \cdot \{1 - (2 \cdot \mu \cdot Rc)/(\tan\theta \cdot Ra)\} \cdot Fs$$

That is, the transmission torque capacity is reduced in correspondence with $(2 \cdot \mu \cdot Rc)/(\tan\theta \cdot Ra)$.

In this manner, according to the third aspect of performance, the different pressure forces can be generated so as to increase the transmission torque capacity in the forward rotation mode of the engine and to decrease it in the reverse rotation mode. Especially in the engine braking operation, etc., accordingly, the pressure force for engaging (or applying) the clutch can be relieved, and the precision of a clutch control is enhanced owing to a smaller gain (owing to the fact that the increase or decrease of the frictional engagement force is smaller relative to the increase or decrease of the differential oil pressure).

As described above, according to the present invention, increase in the transmission torque capacity of a fluid clutch can be attained merely by making the minor alterations of constituent members, with the result that the size of the fluid clutch can be made smaller to enhance the on-vehicle mounting quality thereof.

What is claimed is:

1. A fluid clutch system having a torque input member and a torque output member, wherein a piston is arranged so as to be axially movable frontwards and rearwards relative to a surface opposing to the piston, a first oil chamber and a second oil chamber are formed on both axial sides of said piston holding the piston therebetween, and wherein said piston is moved in the axial direction thereof till the piston contacts with said opposing surface by a difference between internal pressures of said first and second oil chambers, so that a frictional engagement force can be generated between said piston and said opposing surface for torque transmission between said torque input member and said torque output member via said piston and said opposing surface, said fluid clutch system comprising:

assistant pressure force generation means for generating a pressure force which assists said frictional engagement force based on a movement of said piston.

2. A fluid clutch system as defined in claim 1, wherein said piston is joined through an engagement portion with a transmission member which is mated with said piston, and said assistant pressure force generation means is so constructed that a piston side member and said transmission member contact with each other at said engagement portion with an inclination of predetermined angle at which said piston undergoes a component force in said axial direction thereof.

3. A fluid clutch system as defined in claim 1, further comprising second frictional force generation means for generating a further frictional engagement force at a position separate from said opposing surface, by receiving a reaction force of the assistant pressure force when said assistant pressure force has been generated.

4. A fluid clutch system as defined in claim 2, further comprising second frictional force generation means for generating a further frictional engagement force at a position separate from said opposing surface, by receiving a reaction force of the assistant pressure force when said assistant pressure force has been generated.

5. A fluid clutch system as defined in claims 1, wherein said assistant pressure force generation means generates assistant pressure forces which differ between during driving state of an engine and during driven state thereof.

6. A fluid clutch system as defined in claims 2, wherein said assistant pressure force generation means generates assistant pressure forces which differ between during driving state of an engine and during driven state thereof.

7. A fluid clutch system as defined in claims 3, wherein said assistant pressure force generation means generates assistant pressure forces which differ between during driving state of an engine and during driven state thereof.

8. A fluid clutch system as defined in claims 4, wherein said assistant pressure force generation means generates assistant pressure forces which differ between during driving state of an engine and during driven state thereof.

* * * * *